United States Patent
Masui et al.

(10) Patent No.: US 8,594,327 B2
(45) Date of Patent: Nov. 26, 2013

(54) DEVICE, PROGRAM, AND METHOD FOR TRANSMITTING OR RECEIVING AN IMAGE THROUGH ELECTRONIC MAIL

(75) Inventors: Takanori Masui, Ebina (JP); Masato Sugii, Kawasaki (JP); Makoto Takada, Ebina (JP); Nobumi Kusano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1587 days.

(21) Appl. No.: 11/261,006

(22) Filed: Oct. 28, 2005

(65) Prior Publication Data

US 2007/0050616 A1 Mar. 1, 2007

(30) Foreign Application Priority Data

Aug. 24, 2005 (JP) ................................ 2005-242027

(51) Int. Cl.
*H04N 1/44* (2006.01)
(52) U.S. Cl.
USPC ............ 380/243; 713/150; 713/153; 358/407
(58) Field of Classification Search
USPC .................... 713/150, 153; 358/407; 380/243
See application file for complete search history.

(56) References Cited

U.S. PATENT DOCUMENTS

| | | | | |
|---|---|---|---|---|
| 6,028,679 | A * | 2/2000 | Murphy ........................ | 358/407 |
| 6,097,797 | A * | 8/2000 | Oseto ........................ | 379/100.08 |
| 6,208,426 | B1 * | 3/2001 | Saito et al. .................... | 358/1.15 |
| 6,288,799 | B1 | 9/2001 | Sekiguchi | |
| 6,683,698 | B2 * | 1/2004 | Toyoda et al. ................ | 358/1.15 |
| 6,753,980 | B1 * | 6/2004 | Sakakura et al. ............. | 358/440 |
| 7,152,159 | B2 * | 12/2006 | Toyota et al. ................. | 713/161 |
| 7,196,807 | B2 * | 3/2007 | Goldstone .................... | 358/1.15 |
| 7,403,311 | B2 * | 7/2008 | Kagawa ........................ | 358/474 |
| 7,423,774 | B2 * | 9/2008 | Otsuka et al. ................. | 358/1.15 |
| 7,437,366 | B2 * | 10/2008 | Matsuzawa et al. ........... | 707/10 |
| 7,716,288 | B2 * | 5/2010 | Graham et al. ............... | 709/206 |
| 2001/0022665 | A1 * | 9/2001 | Yajima et al. ................. | 358/1.13 |
| 2002/0054365 | A1 * | 5/2002 | Eguchi .......................... | 358/405 |
| 2002/0157028 | A1 * | 10/2002 | Koue et al. .................... | 713/202 |
| 2003/0058478 | A1 * | 3/2003 | Aoki ............................. | 358/402 |
| 2005/0105121 | A1 * | 5/2005 | Hirano ......................... | 358/1.14 |

FOREIGN PATENT DOCUMENTS

| | | |
|---|---|---|
| CN | 1204436 | 1/1999 |
| CN | 1207848 | 2/1999 |
| JP | 10257091 | 9/1998 |
| JP | 2004153472 | 5/2004 |

OTHER PUBLICATIONS

Huang Hongtao, "How To Transmit An Electronic Mail", Computer Knowledge and Technology, 2004, vol. 32, pp. 27-28, with Concise Explanation of Relevance for Non-English Language Information.
Office Action (7 pages) from a Chinese Patent Application No. 2005101294925, with English Translation (6 pages).
Japanese Notice of Grounds for Rejection corresponding to Japanese Application No. 2005-242027 mailed on Mar. 16, 2010, and English translation thereof.

* cited by examiner

*Primary Examiner* — Yin-Chen Shaw
(74) *Attorney, Agent, or Firm* — Gesmer Updegrove LLP

(57) ABSTRACT

A scanned image transmitting device has an instruction-creating section that creates an instruction describing a process instruction in relation to a scanned image; an electronic mail creating section that creates an electronic mail including the scanned image and the instruction; an encrypting section that encrypts at least a portion of the electronic mail using a public key of a transmission destination; and a transmitting section that transmits the encrypted electronic mail to the transmission destination.

25 Claims, 2 Drawing Sheets

DEVICE, PROGRAM, AND METHOD FOR TRANSMITTING OR RECEIVING AN IMAGE THROUGH ELECTRONIC MAIL

BACKGROUND OF THE INVENTION

1. Field of the Invention

The present invention relates to a technique for transmitting, receiving, or relaying an image through an electronic mail.

2. Description of the Related Art

Internet facsimile, in which the entirety or a portion of the function of a facsimile is substituted by the Internet, is currently spreading rapidly. In this technique, a transmission process and a reception process are controlled by an electronic mail address which is set according to a regulation of RFC (Request For Comment) 3192. For example, in an off-ramp transmission, by transmitting to an electronic mail address of "FAX=012345@relay.fax.com" an electronic mail to which a scanned image is attached, a device having a domain name of "relay.fax.com" can be instructed to transmit the scanned image via facsimile to the facsimile number of "012345." Alternatively, in a box-storage transmission, for example, by transmitting to an electronic mail address of "BOX001@fax.com" an electronic mail to which a scanned image is attached, a device having a domain name of "fax.com" can be instructed to store the scanned image in a security box which is named "BOX001." The "security box" refers to a storage region which is personally assigned to the user.

In the Internet facsimile described above, the image can be made secret or the like on the network using an encrypted mailing protocol such as S/MIME (Secure Multipurpose Internet Mail Extensions). However, a public key certificate is normally issued for each electronic mail address. Therefore, in a system in which the electronic mail address is changed every time the transmission destination of the facsimile or the box number is changed, such as the system of the off-ramp transmission and the system of the box-storage transmission as described above, a new public key certificate must be prepared every time the electronic mail address changes. Therefore, such a configuration requires a high cost and a certain processing time and is not suited for practical use.

SUMMARY OF THE INVENTION

According to one aspect of the present invention, there is provided a scanned image transmitting device having an instruction creating section that creates an instruction describing a process instruction in relation to a scanned image; an electronic mail creating section that creates an electronic mail including the scanned image and the instruction; an encrypting section that encrypts at least a portion of the electronic mail using a public key of a transmission destination; and a transmitting section that transmits the encrypted electronic mail to the transmission destination.

According to another aspect of the present invention, there is provided a storage medium readable by a computer, the storage medium storing a program of instructions executable by the computer to perform a function having an instruction-creating step for creating an instruction describing a process instruction in relation to a scanned image; an electronic mail creating step for creating an electronic mail including the scanned image and the instruction; an encrypting step for encrypting at least a portion of the electronic mail using a public key of a transmission destination; and a transmitting step for transmitting the encrypted electronic mail to the transmission destination.

According to another aspect of the present invention, there is provided a method having an instruction-creating step for creating an instruction describing a process instruction in relation to a scanned image; an electronic mail creating step for creating an electronic mail including the scanned image and the instruction; an encrypting step for encrypting at least a portion of the electronic mail using a public key of a transmission destination; and a transmitting step for transmitting the encrypted electronic mail to the transmission destination.

According to another aspect of the present invention, there is provided an image receiving and processing device having a receiving section that receives an electronic mail; a decoding section that decodes the electronic mail, which has been encrypted using a public key, using a private key corresponding to the public key; and a processing section that processes an image included in the decoded electronic mail according to an instruction included in the decoded electronic mail.

According to another aspect of the present invention, there is provided a storage medium readable by a computer, the storage medium storing a program of instructions executable by the computer to perform a function having a receiving step for receiving an electronic mail; a decoding step for decoding the electronic mail, which has been encrypted using a public key, using a private key corresponding to the public key; and a processing step for processing an image included in the decoded electronic mail according to an instruction included in the decoded electronic mail.

According to another aspect of the present invention, there is provided a method having a receiving step for receiving an electronic mail; a decoding step for decoding the electronic mail, which has been encrypted using a public key, using a private key corresponding to the public key; and a processing step for processing an image included in the decoded electronic mail according to an instruction included in the decoded electronic mail.

BRIEF DESCRIPTION OF THE DRAWINGS

An embodiment of the present invention will be described in detail by reference to the drawings, wherein.

DETAILED DESCRIPTION OF THE INVENTION

Figure 1:
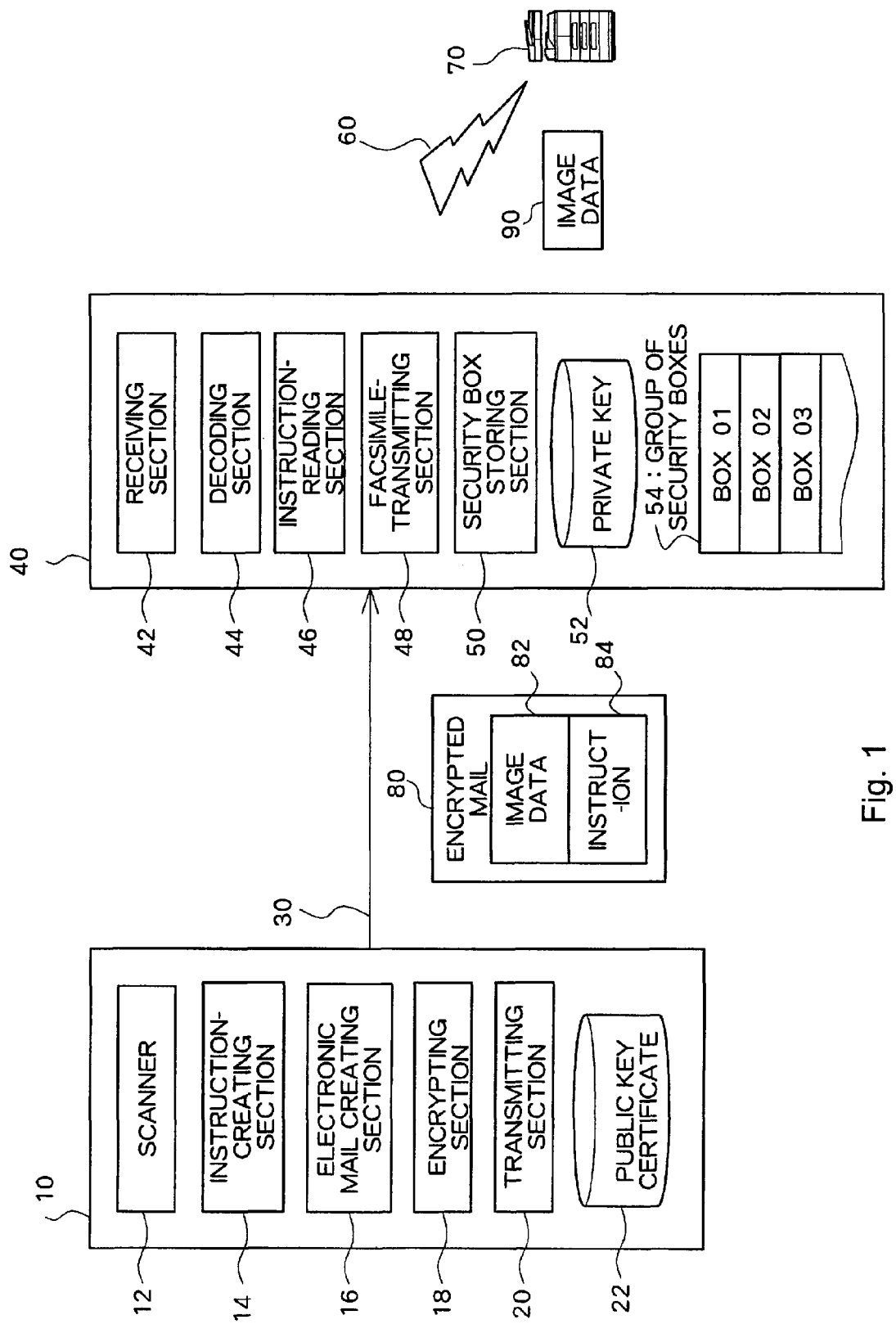
FIG. 1 is a block diagram for explaining an example structure of a device according to an embodiment of the present invention.

FIG. 1 is a block diagram for explaining a system structure according to an embodiment of the present invention. FIG. 1 shows, as primary elements, a transmitting station 10, the Internet 30, a reception/relay station 40, a facsimile transmission network 60, and a terminal station 70. In this structure, each of the transmitting station 10, the reception/relay station 40, and the terminal station 70 is assumed to be a multifunction machine having a copying function (scanning and printing) and a facsimile function. In FIG. 1, only a characteristic portion of each device is shown, in order to clarify the role of the device.

The transmission station 10 has a scanner 12, an instruction-creating section 14, an electronic mail creating section 16, an encrypting section 18, a transmitting section 20, and a public key certificate 22. The scanner 12 is a device which optically reads a document described on paper and creates a scanned image; that is, image data. The instruction-creating section 14 creates an instruction describing a process with respect to the image data on the basis of a user's instruction. In addition to selection of a normal facsimile transmission (that is, transmission using only a facsimile line) through a user interface of the transmitting station 10, the user can select transmission through the Internet 30 in the user interface.

Transmission forms through the Internet 30 include, for example, off-ramp transmission and box-storage transmission. In off-ramp transmission, the image data are transmitted to a transmission destination on the Internet via an electronic mail and the transmission destination instructs transmission of image data via facsimile to a facsimile transmission destination. The user sets the transmission destination on the Internet and the facsimile transmission destination by referring to an address book or directly inputting the address. In box-storage transmission, image data are transmitted to a transmission destination on the Internet via an electronic mail and the image data are stored in a security box at the transmission destination. The user designates the transmission destination on the Internet and the security box by referring to the address book or by directly inputting the address.

The electronic mail creating section 16 creates an electronic mail to which the image data and the instruction are attached. The encrypting section 18 encrypts the created electronic mail according to a standard setting or a user's instruction. With this process, the image data and the instruction can be made secret. The public key certificate 22 corresponds to the transmission destination on the Internet and is used for the encryption. The public key certificate 22 can be obtained as necessary from a public key database (not shown) of a certification authority on the Internet 30. The transmitting section 20 transmits the encrypted electronic mail to the transmission destination on the Internet.

An encrypted mail 80 which is transmitted on the Internet is schematically shown in FIG. 1. Encrypted image data 82 and an encrypted instruction 84 are attached to the encrypted mail 80.

The reception/relay station 40 is a device which is set as the transmission destination of the electronic mail. The reception/relay station 40 has a receiving section 42, a decoding section 44, an instruction-reading section 46, a facsimile-transmitting section 48, a security box storing section 50, a private key 52, and a group of security boxes 54. The receiving section 42 receives an electronic mail. The decoding section 44 determines whether or not the electronic mail is encrypted, and, when the electronic mail is encrypted, applies a decoding process using the private key 52. The instruction-reading section 46 determines whether or not the decoded electronic mail includes an instruction, and, when the decoded electronic mail includes an instruction, reads the instruction.

The facsimile-transmitting section 48 transmits the image data attached to the electronic mail to a facsimile number of the transmission destination described in the instruction when off-ramp transmission; that is, facsimile transmission, is instructed. For example, when the facsimile number corresponds to the terminal station 70, image data 90 extracted from the electronic mail are transmitted through the facsimile transmission network 60 which is formed with a phone line or the like. The terminal station 70 prints the image data on paper using the printer function.

The security box storage section 50 stores the image data attached to the electronic mail in the security box described in the instruction when the instruction instructs the box-storage transmission; that is, storage to the security box. In the illustrated configuration, multiple security boxes, each having an identifier name such as BOX01, BOX02, BOX03 attached thereto, are prepared in the group of the security boxes 54. The image data are stored in the security box corresponding to the name described in the instruction.

Next, a flow of a process for off-ramp transmission and box-storage transmission will be described. When off-ramp transmission is to be performed from the transmitting station 10, a user operates the user interface to select a facsimile transmission destination and relay station (transmission destination on the Internet) using an address book. Then, the user instructs encryption and presses a scan start button after setting paper. The scanner 12 reads the paper to create image data, and the instruction-creating section 14 creates an instruction to instruct off-ramp transmission.

Figure 2:
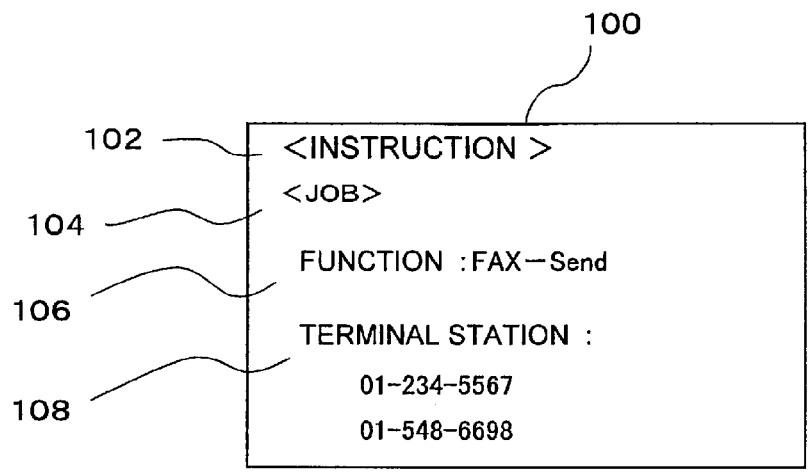
FIG. 2 is a diagram schematically showing an example instruction for instructing facsimile transmission.

FIG. 2 is a diagram schematically showing an example instruction which is created when off-ramp transmission is to be performed. An instruction 100 is described in a form of markup text data such as XML (Extensible Markup Language). A mark 102 indicates that this file is an instruction, and a mark 104 indicates a job to be instructed by the instruction. That is, the marks indicate that the job to be performed is FAX-Send (facsimile transmission) described in a function 106 and that the facsimile should be transmitted to facsimile numbers "01-234-5567" and "01-548-6698," which are described in a terminal station column 108.

The electronic mail creating section 16 creates an electronic mail to which the created image data and the created instruction are attached, and the encrypting section 18 encrypts the electronic mail through S/MIME using the public key certificate 22 corresponding to the transmission destination of the electronic mail. The transmitting section 20 transmits the encrypted electronic mail to the transmission destination.

Figure 3:
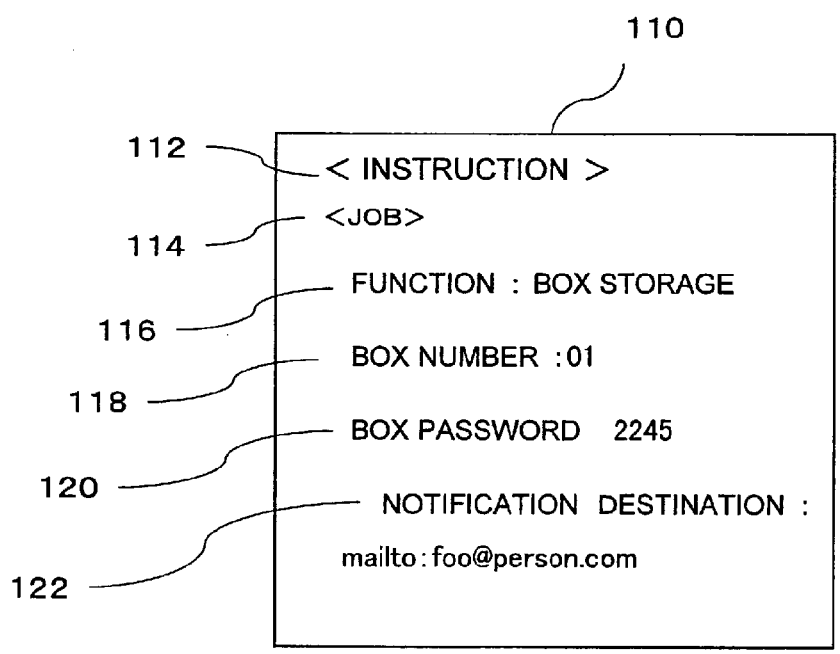
FIG. 3 is a diagram schematically showing an example instruction for instructing storage in a box.

A similar process is performed when box-storage transmission is to be performed from the transmitting station 10. In this process, however, the user sets an identifier name of the security box and a receiving station having a security box (transmission destination on the Internet). FIG. 3 is a diagram schematically showing an example instruction which is created when a box-storage transmission is performed. An instruction 110 is created in a manner similar to that of FIG. 2 and includes a mark 112 which indicates that the file is an instruction and a mark 114 which indicates the job. In this case, a function column 116 stores information that box-storage should be performed, a BOX number column 118 indicates that the security box to which the data is to be stored is "BOX01," and a BOX password column 120 indicates that the password necessary for accessing the box is "2245." A notification destination column 122 is provided instructing notification of the processing result of the box storage via an electronic mail to a destination "foo@person.com."

In the reception/relay station 40, the electronic mail thus created and transmitted is received by the receiving section 42. The decoding section 44 determines whether or not the received electronic mail is encrypted, and, when the received electronic mail is encrypted, decodes the electronic mail using the private key 52. The instruction-reading section 46 determines whether or not an instruction is attached to the electronic mail, and, when an instruction is attached, starts the job described in the instruction. In other words, when a facsimile transmission is instructed, the facsimile-transmitting section 48 is started up and image data attached to the electronic mail are transmitted via facsimile to the facsimile number described in the instruction. When, on the other hand, storage to a security box is instructed, the security box storing section 50 is started up and the image data attached to the electronic mail are stored in the security box described in the instruction using the password described in the security box. In addition, when a notification destination is described in the instruction, a processing result of whether the process is successful or an error has occurred is reported to the notification destination. When no instruction is attached, a process is performed according to a standard setting. For example, image data are forcefully printed in a manner similar to a normal facsimile transmission.

In the above description, an embodiment has been described in which image data created through a scanning process are transmitted and processing is instructed. The present invention, however, is not limited to such a form and may be applied to general image data in place of the scanned image data or to general data other than image data (for example, a program, document data, etc.). In the above description, the embodiment is applied to a multifunction machine having a copying function, but the present invention is not limited to such a configuration and can be applied as necessary to various hardware systems including a general PC having a peripheral device such as a scanner and a printer.

Next, various modifications of the embodiment of the present invention will be described.

In one embodiment of the present invention, the scan image transmitting device can be realized by controlling one or multiple pieces of hardware having a calculation function using software (program). More specifically, a form may be considered in which necessary software is incorporated into hardware such as a facsimile device (a device which primarily transmits and receives a facsimile), a scanner (a device which primarily scans), a multifunction machine (for example, a device having functions of a scanner, a printer, a facsimile device, etc.), and a PC (personal computer). The scanned image is image data created using a scanner to read a document (including drawings and photograph) on paper. The scanned image is typically represented in a raster (bitmap) format, but may be represented by another format, such as a vector format. The scanner may be built in the scanned image transmitting device or may be separately provided from the scanned image transmitting device.

The scanned image transmitting device transmits the scanned image to the transmission destination via electronic mail and instructs the transmission destination to process the scanned image. The instruction-creating section creates an instruction to instruct the process according to a user's instruction or setting. The instruction may describe a direct instruction to the device at the transmission destination or an indirect instruction. An indirect instruction refers to an instruction in which no specific instruction is described, but at least the device at the transmission destination can recognize the instruction on the basis of a predetermined rule which is defined in advance. The instruction may be described to be readable by the user (using an editor program or the like) or may be unreadable to the user, such as an object code. The instruction may be formed by a single file or may be, for example, embedded in a header of the scanned image file or, when multiple instruction items are present, may be divided into multiple files on the basis of the items.

The electronic mail creating section creates an electronic mail in which the scanned image and the instruction are incorporated through attachment or the like. The encrypting section encrypts at least a portion of the electronic mail using a public key of the transmission destination of the electronic mail. Typically, one or both of the scanned image and the instruction are encrypted. The encryption may be executed after the electronic mail is created or before the electronic mail is created. The public key can be obtained normally by obtaining a public key certificate corresponding to the mail address of the transmission destination. The encrypted electronic mail is transmitted to the transmission destination by the transmitting section.

According to this configuration, an electronic mail including a scanned image can be securely transmitted using the public key encryption. In addition, the transmission destination can be instructed to process the image. Moreover, unlike a setting in the Internet facsimile, because the mail address of the transmission destination is set at a fixed value independent of the destination of the process, such as the destination of the off-ramp transmission and the box number of box-storage transmission, the same public key (public key certificate) may be used despite the public key depending on the electronic mail. Therefore, even when there are various destinations of the off-ramp transmission and box numbers of the box-storage transmission, transmission can be performed at small expense and quickly.

In another embodiment of the present invention, in the scanned image transmitting device, the transmission destination of the electronic mail is a facsimile relay station having a function of transmitting via a facsimile, and the instruction includes one or multiple facsimile numbers to which the facsimile relay station is to transmit the scanned image via facsimile. The facsimile relay station refers to a system (device) which transmits via facsimile the image data received through an electronic mail. The term transmission via facsimile refers to a process of transmitting image data according to a protocol for facsimile through a phone line or its substitute (including an IP phone and a wireless phone). The instruction directly or indirectly instructs the transmission via facsimile and describes a facsimile number or the like. When instructing multiple devices to transmit via facsimile is desired, multiple facsimile numbers may be described in a single instruction.

In another embodiment of the present invention, in the scanned image transmitting device, the transmission destination of the electronic mail is a terminal station having multiple security boxes which store scanned images, and the instruction includes identification information of one or multiple security boxes to which the terminal station is to store the scanned image. The security box is a storage location for each individual for an image file which is set in a storage device, such as a hard disk drive or a semiconductor memory, and is similar to a directory in UNIX (registered trademark) and a folder in Windows (registered trademark). The instruction directly or indirectly instructs transmission via facsimile and describes identification information (for example, identification name) of the security box. When storing an image file in multiple security boxes is desired, identification information of multiple security boxes can be described in the instruction.

In another embodiment of the present invention, the scanned image transmitting device further has a scanner that scans an image to create a scanned image. The scanner is a device which converts a document on paper into electronic data and typically reads the document through an optical action. The scanned image transmitting device may be realized as a device having the scanner as a primary element or may be realized as a multifunction machine having a printer.

The image receiving and processing device can be realized by controlling one or multiple pieces of hardware having a calculation function using software (program). More specifically, a form may be considered in which necessary software is incorporated into hardware, such as a facsimile machine (which primarily transmits and receives via facsimile), a multifunction machine (for example, a device having functions of printer, facsimile, etc.), and a PC (personal computer). The receiving section is a section which receives an electronic mail and the decoding section decodes the received electronic mail using the private key corresponding to a public key when the received electronic mail is encrypted using the public key. The private key is managed in the image receiving and processing device in a secure manner. The processing section processes the image according to the instruction when the decoded electronic mail includes the instruction and the image by means of attachment or the like.

In another embodiment of the present invention, the image receiving and processing device has a function of transmitting via facsimile, to a facsimile number, the instruction including one or multiple facsimile numbers to which the image included in the electronic mail is to be transmitted via facsimile, and the processing section transmits the image to the facsimile number via facsimile. In another embodiment of the present invention, the image receiving and processing device has multiple security boxes that store images, the instruction includes identification information of one or multiple security boxes to which an image included in the electronic mail is to be stored, and the processing section stores the image in the security box.

In another embodiment of the present invention, in the image receiving and processing device, the instruction includes a notification destination to which a processing result is to be reported, and the image receiving and processing device has a reporting section that reports the processing result to the notification destination. The notification destination is described as, for example, an electronic mail address and a facsimile number. The notification destination may be different from the scanned image transmitting device and the facsimile transmission destination and may be, for example, the contact address of the user who uses these devices.

The complete disclosure of Japanese Patent Application No. 2005-242027 filed on Aug. 24, 2005, including the specification, claims, drawings, and abstract, is incorporated herein by reference.

What is claimed is:

1. A scanned image transmitting device comprising:
a processor that creates an instruction file describing a process instruction in relation to a scanned image and instructing transmission via facsimile by a facsimile relay station, the instruction file including identification information corresponding to one or a plurality of facsimile numbers to which the facsimile relay station is to transmit the scanned image via facsimile;
said processor creating an electronic mail attached with a file of the scanned image and the instruction file;
said processor encrypting at least a portion of the electronic mail and the scanned image file and the instruction file using a public key of a transmission destination; and
transmitting circuitry that transmits the encrypted electronic mail attached with the encrypted scanned image file and the encrypted instruction file to the transmission destination, the transmission destination of the electronic mail being the facsimile relay station having a function of transmitting the scanned image via facsimile;
wherein the scanned image is automatically transmitted, via the facsimile relay station, to one or a plurality of facsimile numbers included in the encrypted instruction file when the encrypted instruction file that instructs transmission via facsimile is included in the electronic mail;
wherein the instruction file has first mark information indicating that the file is an instruction, second mark information indicating a job instructed by the instruction file, a function description indicating a security box storage function to be executed in the job, a number description indicating a security box number as a storage location in which the scanned image is stored by the security box storage function, a password of the security box as the storage location, and a notification destination description indicating a notification destination to which a result of storage processing in the security box as the storage location is notified.

2. A scanned image transmitting device according to claim 1, wherein the transmission destination of the electronic mail is a terminal station having a plurality of security boxes which store the scanned images, and the instruction includes identification information of one or a plurality of the security boxes to which the terminal station is to store the scanned image.

3. A scanned image transmitting device according to claim 1, further comprising a scanner that scans an image to create the scanned image.

4. A scanned image transmitting device according to claim 1, wherein said processor creates the instruction file using a markup language in which markup is applied to text data.

5. A scanned image transmitting device according to claim 1, wherein said processor describes, in the instruction file, a notification destination to which a processing result is to be reported.

6. A non-transitory storage medium readable by a computer, the storage medium storing a program of instructions executable by the computer to perform a function comprising:
creating an instruction file describing a process instruction in relation to a scanned image and instructing transmission via facsimile by a facsimile relay station, the instruction file including identification information corresponding to one or a plurality of facsimile numbers to which the facsimile relay station is to transmit the scanned image via facsimile;
creating an electronic mail attached with a file of the scanned image and the instruction file;
encrypting at least a portion of the electronic mail and the scanned image file and the instruction file using a public key of a transmission destination; and
transmitting the encrypted electronic mail attached with the encrypted scanned image file and the encrypted instruction file to the transmission destination, the transmission destination of the electronic mail being the facsimile relay station having a function of transmitting the scanned image via facsimile, the facsimile relay station having a function to automatically transmit, via facsimile, the scanned image to one or a plurality of facsimile numbers included in the instruction file when the instruction file that instructs transmission via facsimile is included in the electronic mail;
wherein the instruction file has first mark information indicating that the file is an instruction, second mark information indicating a job instructed by the instruction file, a function description indicating a security box storage function to be executed in the job, a number description indicating a security box number as a storage location in which the scanned image is stored by the security box storage function, a password of the security box as the storage location, and a notification destination description indicating a notification destination to which a result of storage processing in the security box as the storage location is notified.

7. The non-transitory storage medium according to claim 6, wherein the transmission destination of the electronic mail is a terminal station having a plurality of security boxes that store the scanned image; and the instruction includes identification information of one or a plurality of the security boxes to which the terminal station is to store the scanned image.

8. A method comprising:

creating an instruction file describing a process instruction in relation to a scanned image and instructing transmission via facsimile by a facsimile relay station, the instruction file including identification information corresponding to one or a plurality of facsimile numbers to which the facsimile relay station is to transmit the scanned image via facsimile;

creating an electronic mail attached with a file of the scanned image and the instruction file;

encrypting at least a portion of the electronic mail and the scanned image file and the instruction file using a public key of a transmission destination; and transmitting the encrypted electronic mail attached with the encrypted scanned image file and the encrypted instruction file to the transmission destination, the transmission destination of the electronic mail being the facsimile relay station having a function of transmitting the scanned image via facsimile, the facsimile relay station having a function to automatically transmit, via facsimile, the scanned image to one or a plurality of facsimile numbers included in the instruction file when the instruction file that instructs transmission via facsimile is included in the electronic mail;

wherein the instruction file has first mark information indicating that the file is an instruction, second mark information indicating a job instructed by the instruction file, a function description indicating a security box storage function to be executed in the job, a number description indicating a security box number as a storage location in which the scanned image is stored by the security box storage function, a password of the security box as the storage location, and a notification destination description indicating a notification destination to which a result of storage processing in the security box as the storage location is notified.

9. An image receiving and processing device comprising:

receiving circuitry that receives an encrypted electronic mail attached with an encrypted scanned image file and an encrypted instruction file; and a processor that decodes the encrypted electronic mail, the encrypted scanned image file, and the encrypted instruction file which has been encrypted using a public key associated with the device receiving the encrypted electronic mail attached with the encrypted scanned image file and encrypted instruction file, using a private key corresponding to the public key, the encrypted instruction file describing a process instruction in relation to a scanned image and instructing transmission via facsimile by a facsimile relay station;

said processor processing the scanned image file included in the decoded electronic mail according to the instruction file included in the decoded electronic mail and transmitting, via facsimile, to a facsimile number, wherein the instruction file includes one or a plurality of facsimile numbers to which the scanned image included in the electronic mail is to be transmitted via facsimile;

said processor automatically transmitting, via facsimile, the scanned image to the facsimile number included in the instruction file when the instruction file that instructs transmission via facsimile is included in the electronic mail;

wherein the instruction file has first mark information indicating that the file is an instruction, second mark information indicating a job instructed by the instruction file, a function description indicating a security box storage function to be executed in the job, a number description indicating a security box number as a storage location in which the scanned image is stored by the security box storage function, a password of the security box as the storage location, and a notification destination description indicating a notification destination to which a result of storage processing in the security box as the storage location is notified.

10. An image receiving and processing device according to claim 9, wherein the instruction is described in a markup language in which markup is applied to text data.

11. An image receiving and processing device according to claim 9, wherein the instruction includes a notification destination to which a processing result is to be reported, and the image receiving and processing device comprises a reporting section that reports the processing result to the notification destination.

12. A non-transitory storage medium readable by a computer, the storage medium storing a program of instructions executable by the computer to perform a function comprising:

receiving an encrypted electronic mail attached with an encrypted scanned image file and an encrypted instruction file;

decoding the encrypted electronic mail, the encrypted scanned image file, and the encrypted instruction file which has been encrypted using a public key associated with the device receiving the encrypted electronic mail attached with the encrypted scanned image file and encrypted instruction file, using a private key corresponding to the public key, the encrypted instruction file describing a process instruction in relation to a scanned image and instructing transmission via facsimile by a facsimile relay station;

processing the scanned image file included in the decoded electronic mail according to the instruction file included in the decoded electronic mail;

transmitting via facsimile to a facsimile number, wherein the instruction file includes one or a plurality of facsimile numbers to which the scanned image included in the electronic mail is to be transmitted via facsimile; and transmitting, via facsimile, the scanned image to the facsimile number included in the instruction file when the instruction file that instructs transmission via facsimile is included in the electronic mail;

wherein the instruction file has first mark information indicating that the file is an instruction, second mark information indicating a job instructed by the instruction file, a function description indicating a security box storage function to be executed in the job, a number description indicating a security box number as a storage location in which the scanned image is stored by the security box storage function, a password of the security box as the storage location, and a notification destination description indicating a notification destination to which a result of storage processing in the security box as the storage location is notified.

13. A method comprising:

receiving an encrypted electronic mail attached with an encrypted scanned image file and an encrypted instruction file;

decoding the encrypted electronic mail, the encrypted scanned image file, and the encrypted instruction file which has been encrypted using a public key associated with the device receiving the encrypted electronic mail attached with the encrypted scanned image file and encrypted instruction file, using a private key corresponding to the public key, the encrypted instruction file describing a process instruction in relation to a scanned image and instructing transmission via facsimile by a facsimile relay station;

processing the scanned image file included in the decoded electronic mail according to the instruction file included in the decoded electronic mail;

transmitting via facsimile to a facsimile number, wherein the instruction file includes one or a plurality of facsimile numbers to which the scanned image included in the electronic mail is to be transmitted via facsimile; and transmitting, via facsimile, the scanned image to the facsimile number included in the instruction file when the instruction file that instructs transmission via facsimile is included in the electronic mail;

wherein the instruction file has first mark information indicating that the file is an instruction, second mark information indicating a job instructed by the instruction file, a function description indicating a security box storage function to be executed in the job, a number description indicating a security box number as a storage location in which the scanned image is stored by the security box storage function, a password of the security box as the storage location, and a notification destination description indicating a notification destination to which a result of storage processing in the security box as the storage location is notified.

14. A scanned image transmitting device according to claim 1, wherein that the one or a plurality of facsimile numbers and the transmission destination are set based on an address book.

15. The non-transitory storage medium according to claim 6, wherein that the one or a plurality of facsimile numbers and the transmission destination are set based on an address book.

16. The method according to claim 8, wherein that the one or a plurality of facsimile numbers and the transmission destination are set based on an address book.

17. An image receiving and processing device according to claim 9, wherein that the one or a plurality of facsimile numbers and the transmission destination are set based on an address book.

18. The non-transitory storage medium according to claim 12, wherein that the one or a plurality of facsimile numbers and the transmission destination are set based on an address book.

19. The method according to claim 13, wherein that the one or a plurality of facsimile numbers and the transmission destination are set based on an address book.

20. A scanned image transmitting device according to claim 1, wherein the instruction file has first mark information indicating that the file is an instruction, second mark information indicating a job instructed by the instruction file, a function description indicating a facsimile transmission function to be executed in the job, and a number description indicating a facsimile number as a transmission destination to which the scanned image is transmitted by the facsimile transmission function.

21. The non-transitory storage medium according to claim 6, wherein the instruction file has first mark information indicating that the file is an instruction, second mark information indicating a job instructed by the instruction file, a function description indicating a facsimile transmission function to be executed in the job, and a number description indicating a facsimile number as a transmission destination to which the scanned image is transmitted by the facsimile transmission function.

22. The method according to claim 8, wherein the instruction file has first mark information indicating that the file is an instruction, second mark information indicating a job instructed by the instruction file, a function description indicating a facsimile transmission function to be executed in the job, and a number description indicating a facsimile number as a transmission destination to which the scanned image is transmitted by the facsimile transmission function.

23. The image receiving and processing device according to claim 9, wherein the instruction file has first mark information indicating that the file is an instruction, second mark information indicating a job instructed by the instruction file, a function description indicating a facsimile transmission function to be executed in the job, and a number description indicating a facsimile number as a transmission destination to which the scanned image is transmitted by the facsimile transmission function.

24. The non-transitory storage medium according to claim 12, wherein the instruction file has first mark information indicating that the file is an instruction, second mark information indicating a job instructed by the instruction file, a function description indicating a facsimile transmission function to be executed in the job, and a number description indicating a facsimile number as a transmission destination to which the scanned image is transmitted by the facsimile transmission function.

25. The method according to claim 13, wherein the instruction file has first mark information indicating that the file is an instruction, second mark information indicating a job instructed by the instruction file, a function description indicating a facsimile transmission function to be executed in the job, and a number description indicating a facsimile number as a transmission destination to which the scanned image is transmitted by the facsimile transmission function.

* * * * *